(12) United States Patent
Lindloff

(10) Patent No.: US 10,843,755 B1
(45) Date of Patent: Nov. 24, 2020

(54) MOTORCYCLE PASSENGER ARMREST

(71) Applicant: Ciro, LLC, Hudson, WI (US)

(72) Inventor: Christopher Lindloff, New Richmond, WI (US)

(73) Assignee: CIRO, LLC, Hudson, WI (US)

( * ) Notice: Subject to any disclaimer, the term of this patent is extended or adjusted under 35 U.S.C. 154(b) by 0 days.

(21) Appl. No.: 16/510,150

(22) Filed: Jul. 12, 2019

(51) Int. Cl.
*B60N 2/40* (2006.01)
*B62M 7/04* (2006.01)
*B62J 1/02* (2006.01)
*B62J 1/28* (2006.01)

(52) U.S. Cl.
CPC .................... *B62J 1/28* (2013.01)

(58) Field of Classification Search
CPC .. A47C 7/54; A47C 1/03; A47C 7/543; B60N 2/75; B60N 2/753; B60N 2/757; B60N 2/767
See application file for complete search history.

(56) References Cited

U.S. PATENT DOCUMENTS

| | | | | |
|---|---|---|---|---|
| 3,993,350 A * | 11/1976 | McFarlane | ............. | A47C 7/543 297/411.38 |
| 4,225,183 A * | 9/1980 | Hanagan | ............ | B62J 1/12 297/243 |
| 4,549,629 A * | 10/1985 | Komuro | ............ | B60N 2/753 180/219 |
| 4,600,208 A * | 7/1986 | Morishima | ............. | B62J 99/00 280/288.4 |
| 4,690,237 A * | 9/1987 | Funabashi | ............. | B62J 1/28 180/219 |
| 4,695,096 A * | 9/1987 | Kincaid | ............ | B62J 1/28 297/411.31 |
| 7,114,774 B2 * | 10/2006 | Stahel | ............ | A47C 7/68 297/188.15 |
| D555,047 S * | 11/2007 | Colbert | ............ | D12/119 |
| 7,357,456 B1 * | 4/2008 | Freer | ............ | A47C 7/543 297/411.38 |
| 8,491,055 B2 * | 7/2013 | Freer, II | ............ | B60N 2/753 297/411.25 |
| D724,499 S * | 3/2015 | Parvey | ............ | D12/119 |
| 10,421,520 B2 * | 9/2019 | Kamiyama | ............ | B62J 27/00 |
| 2006/0119145 A1 * | 6/2006 | Stahel | ............ | A47C 7/68 297/188.16 |
| 2010/0301656 A1 * | 12/2010 | Lai | ............ | A47C 1/03 297/411.2 |
| 2011/0074188 A1 * | 3/2011 | Freer | ............ | B60N 2/753 297/188.14 |
| 2014/0061269 A1 * | 3/2014 | Hawkins | ............ | B62J 1/007 224/413 |
| 2014/0103691 A1 * | 4/2014 | Boyd | ............ | A47C 9/007 297/344.18 |
| 2015/0028074 A1 * | 1/2015 | Brusky | ............ | B62J 11/00 224/413 |
| 2016/0059753 A1 * | 3/2016 | Steury | ............ | A47C 7/54 297/411.36 |

* cited by examiner

*Primary Examiner* — Shin H Kim
(74) *Attorney, Agent, or Firm* — Dicke, Billig & Czaja, PLLC

(57) ABSTRACT

An armrest for a motorcycle passenger is mountable to a trunk lid that carries a passenger backrest to support a passenger's arm. The armrest can include a mount for connecting accessories, such as a drink holder.

11 Claims, 5 Drawing Sheets

MOTORCYCLE PASSENGER ARMREST

BACKGROUND

Motorcycles such as the Honda Goldwing may include a passenger backrest that is mounted to the trunk lid. The backrest, however may not include an armrest. Further, no convenient location may exist for a passenger to store an accessory, such as a cell phone or a GPS device, or a beverage container, in the passenger seating area of the motorcycle. A passenger armrest and an accessory mount carried by an armrest for passengers would be beneficial.

DETAILED DESCRIPTION

Figure 1:
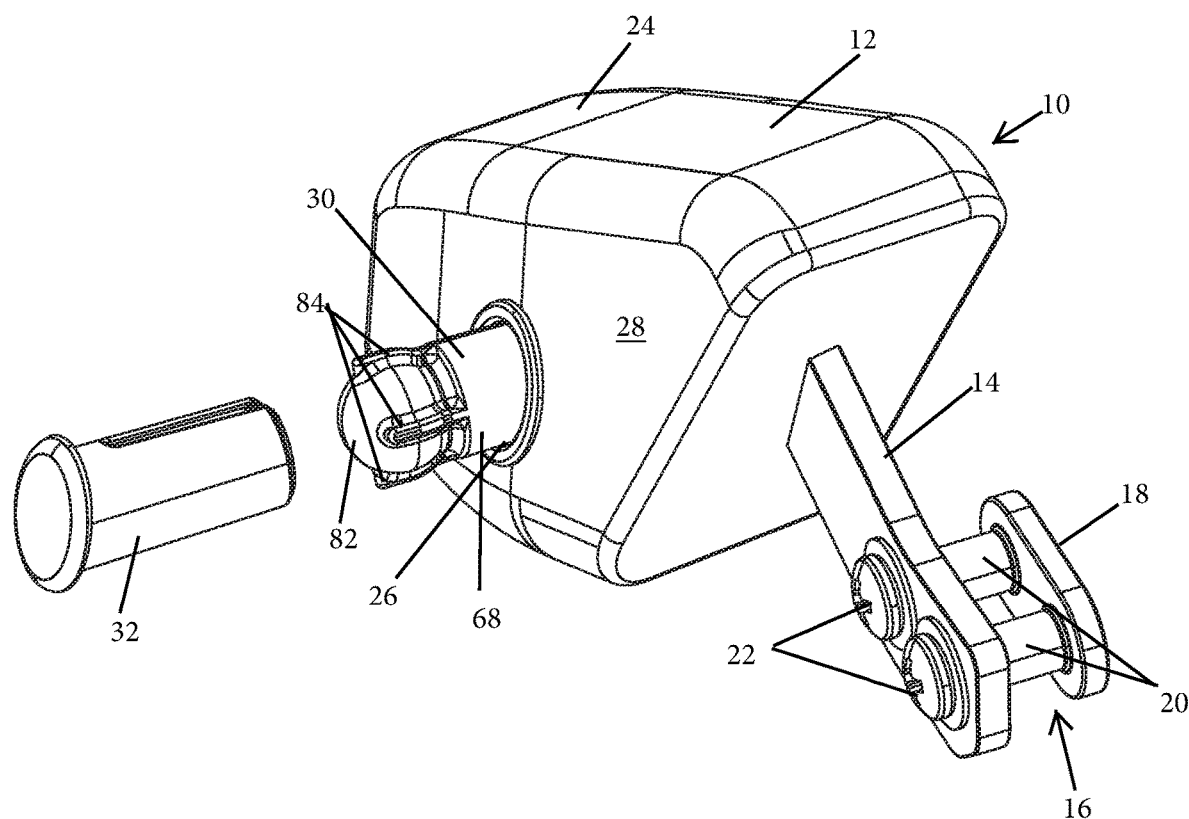
FIG. 1 is a rear perspective view of a motorcycle passenger armrest and optional attachments to the armrest.

FIG. 1 is a rear perspective view of a motorcycle passenger armrest 10 for attachment to a motorcycle structure adjacent to a passenger backrest (not shown). Armrest 10 generally includes a padded body 12 carried on a metal arm 14, which includes a connector 16 at a free end of the arm 14 for attaching armrest 10 to the motorcycle structure. In one embodiment, a suitable motorcycle structure for mounting armrest 10 is a trunk lid, which can be a mounting location for the passenger backrest. FIG. 1 shows one embodiment of connector 16 as comprising a base 18 and first and second posts 20 that extend generally normal to base 18, with each post 20 configured with an internally threaded bore (not shown). Connector 16 captures the motorcycle structure between the base 18 and the arm 14 and is secured to the structure with, for example, screws 22 that thread into posts 20 via holes provided in arm 14.

The padded body 12 includes a cover 24 over all outer surfaces of body 12, and a padding under cover 24 that is incorporated in a conventional molding process. In one embodiment, the cover and padding material is injection molded polyurethane integral skin foam that creates an outer skin that forms the cover over the foam padding. In one embodiment, the body 12 includes an internal cavity 26 that is exposed on a side surface 28 of armrest 10 that faces away from the passenger seating area of the motorcycle, when armrest 10 is mounted to the motorcycle. The cavity 26 is configured to receive a mount member 30 for attaching an accessory with a socket connector, such as a drink holder, or a cavity cover 32 if the mount member 30 is removed from cavity 26.

Figure 2:
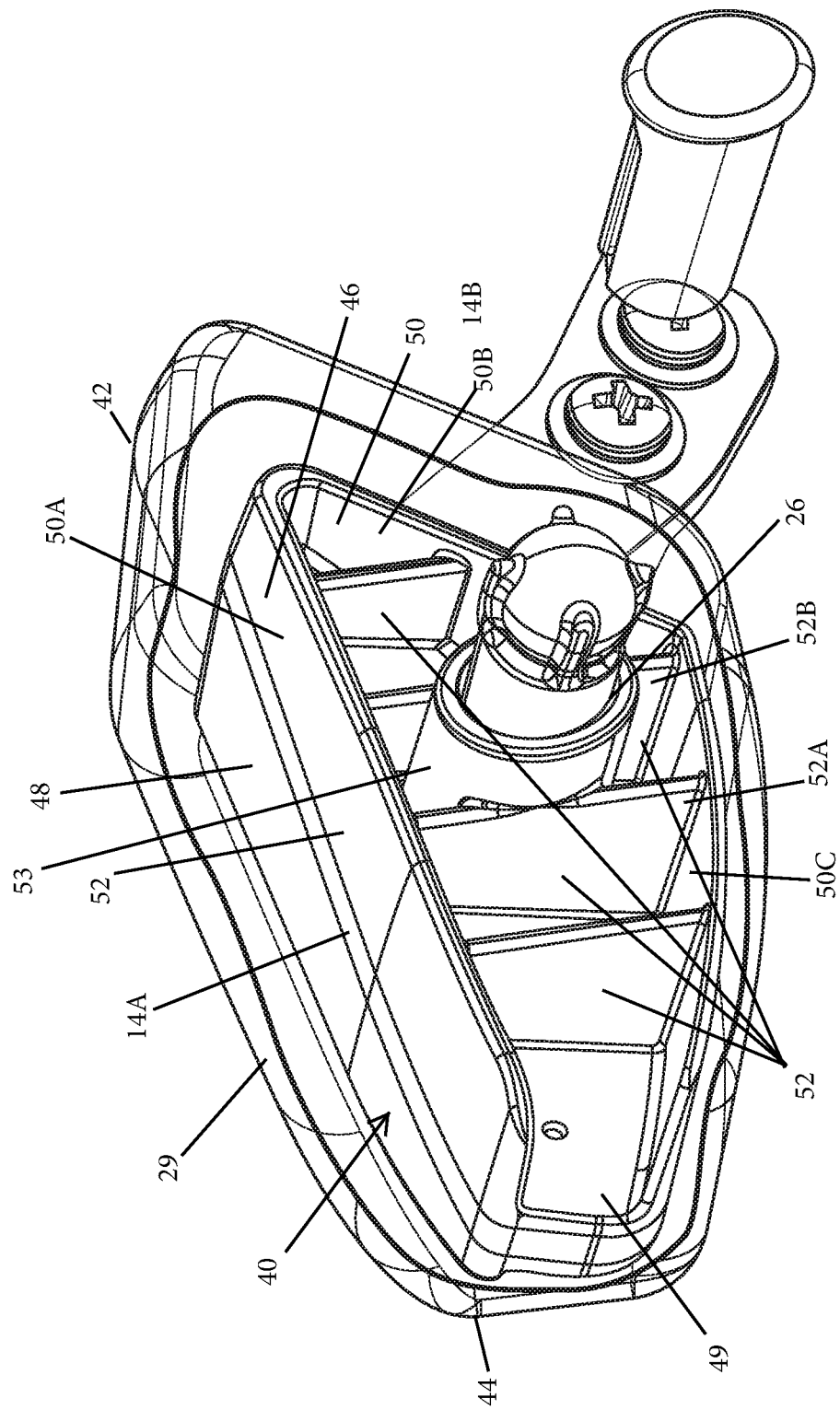
FIG. 2 is a front perspective view of the passenger armrest of FIG. 1 with a portion of the exterior and padding cut away to show an internal framework for the armrest.

FIG. 2 is a front perspective view of the passenger armrest 10 of FIG. 1 with a portion of the cover and padding cut away to show an internal framework 40 for the armrest 10. Framework 40 comprises an arm extension 14A, that extends at an angle relative to arm portion 14B, generally from first end 42 of armrest 10 to second end 44 of armrest 10. In one embodiment, arm extension 14A and arm portion 14B are formed from flat stock aluminum. As further shown in FIG. 2, framework 40 includes a support frames 46 and 48 on opposite sides of arm extension 14A. Support frames 46 and 48 each comprise a molded polymer frame having a base 49 and side walls 50 that extend generally normal to base 49 around the perimeter of base 49. Ribs 52 are connected between top wall 50A, rear wall 50B and bottom wall 50C. Cavity 26 is a generally cylindrical tube 53 that is connected to ribs 52A and 52B, which is generally midway between a first end 42 and a second end 44 of armrest 10. Cavity 26 is oriented to be generally parallel to a top surface 29 of armrest 10. Support frames 46 and 48 are connected to arm extension 14A, such as with screws or adhesive. Framework 40 is over-molded with the polyurethane integral skin foam as previously described.

Figure 3:
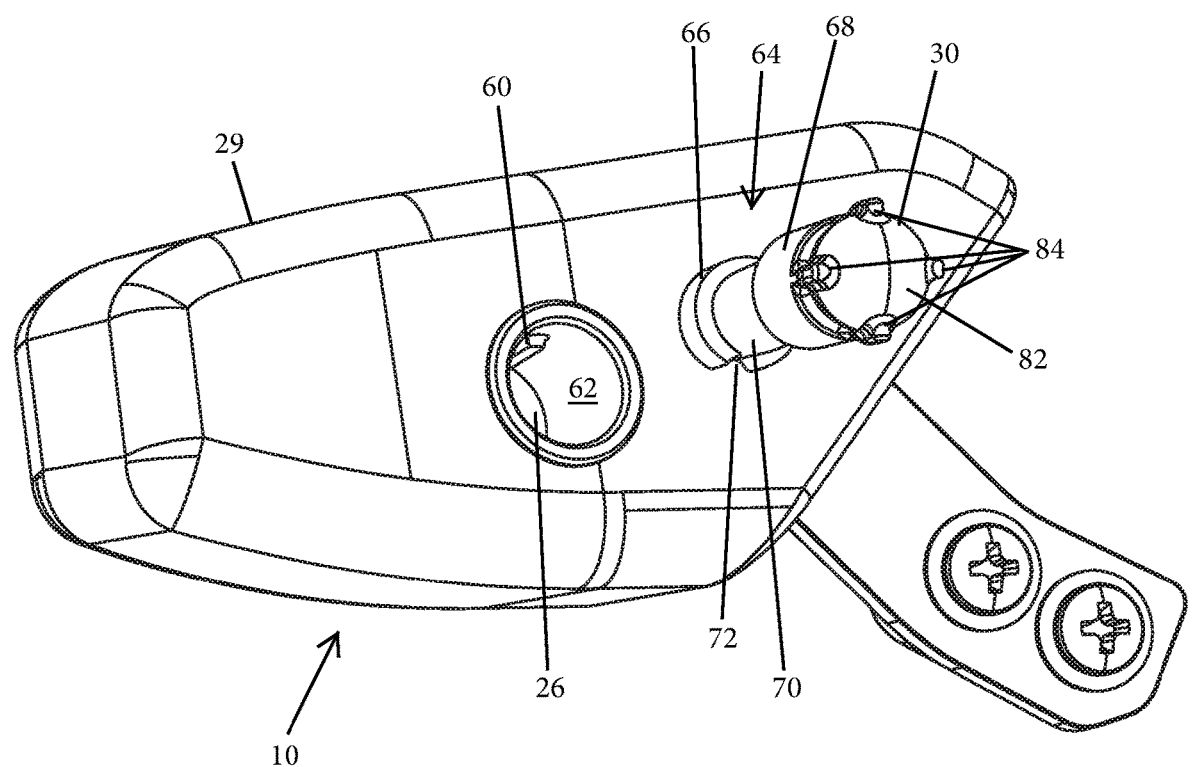
FIG. 3 is an exploded front perspective view of the passenger armrest of FIG. 1 to show the mount connection to the armrest.

FIG. 3 is an exploded front perspective view of the passenger armrest 10 of FIG. 1 to show a connection of mount member 30 to armrest 10. As shown in FIG. 3, cavity 26 includes a key 60 connected to cylindrical surface 62 of cavity 26. In the exemplary embodiment shown, key 60 is located at a 12 o'clock position of cavity 26, which orients key 60 toward top surface 29 of armrest 10. In one embodiment, key 60 is a linear protrusion that is generally parallel to an axis of cavity 26 and connected along a portion of surface 62 within cavity 26. Key 60 functions to retain mount member 30 within cavity 26 when it is inserted therein.

Mount member 30 comprises a generally cylindrical body 64 with a first end portion 66 and a second end portion 68 of generally equal outer diameter, and an intermediate portion 70 with a reduced outer diameter relative to portions 66 and 68. First end portion 66 is formed with a keyway 72 that, when aligned with key 60, allows the body 64 to be inserted into cavity 26. The intermediate portion 70 has a length that is slightly greater than the length of key 70. As such, once first end portion 66 clears key 60, the cylindrical body 64 is able to rotate 180 degrees within cavity 26 to the orientation shown in FIG. 3 to hold mount member 30 within cavity 60 (See FIG. 4).

Figure 4:
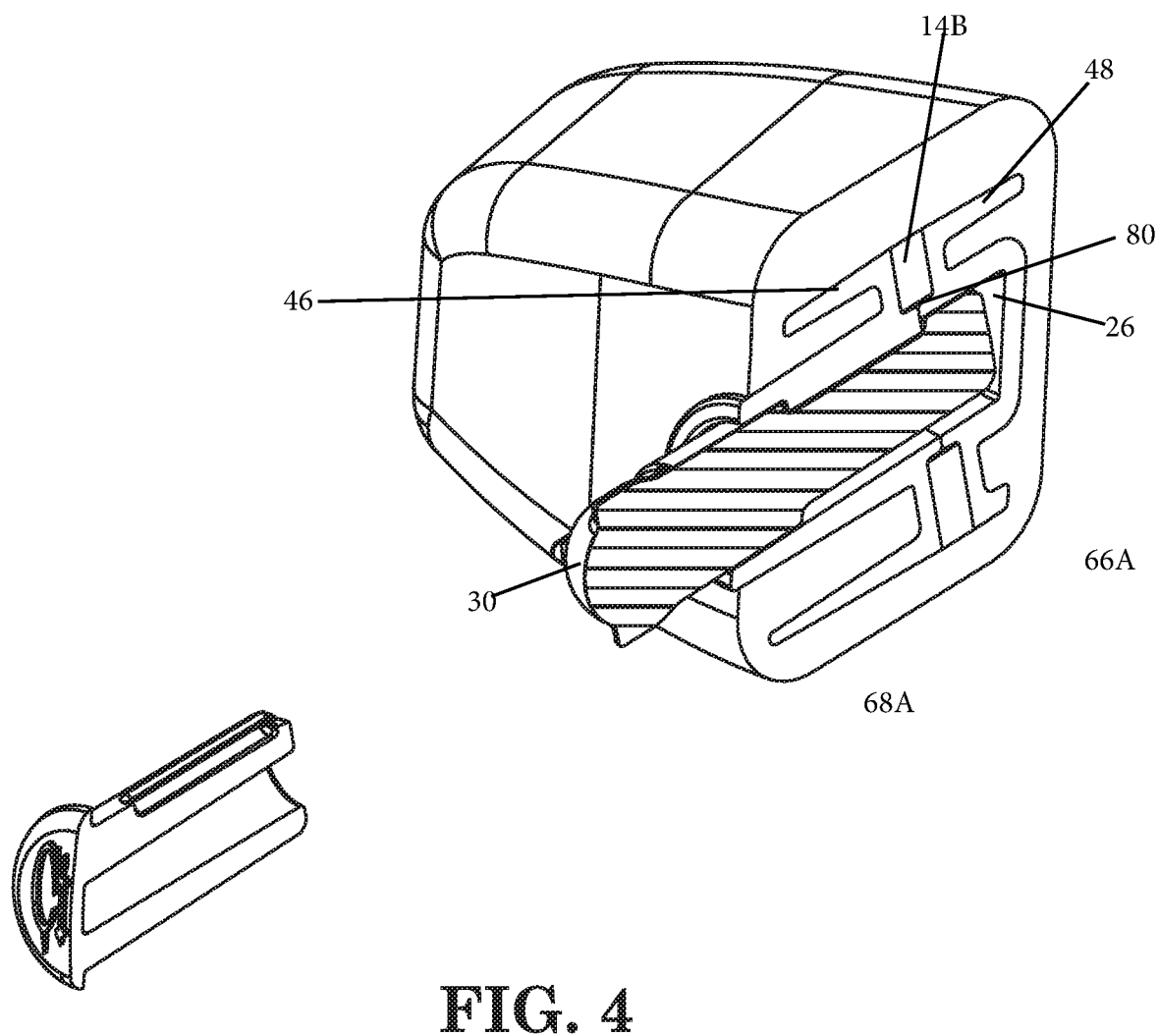
FIG. 4 is a cross-sectional view of the passenger armrest of FIG. 1 taken along line 4-4.

As shown in FIG. 4, cavity 26 extends through an opening 80 in arm extension 14B and terminates in support frame 48. With mount member 30 fully inserted in cavity 26 and with key 60 oriented at the 6 o'clock position (i.e., 180 degrees from the key 60), radial shoulder 66A of first end portion 66 and radial shoulder 68A of second end portion 68 prevent mount member 30 from moving in and out of cavity 26, yet allow mount member 30 to rotate within cavity 26. The ability of the mount member 30 to rotate aids in keeping accessories carried on mount member 30, such as a drink holder, level as the orientation of the motorcycle varies from level. As shown in FIG. 1, with mount member 30 secured within cavity 26, the second end portion 68 lies outside of armrest 10. In one embodiment, end portion 68 includes a spherical terminal end or ball 82 for mounting various accessories with a socket connector. As shown in FIGS. 1 and 3, in one embodiment, ball 82 may include one or more protrusions 84 formed or connected on an outer surface of ball 82. Protrusions 84 serve to fix an accessory within a socket connector in desired orientation and prevent rotation of the ball 82 within the socket. In one embodiment, ball 82 includes four generally equally radially spaced linear protrusions 84 on the outer surface of ball 82 that are generally parallel to the axis of mount member 30. Other spacing, shapes and numbers of protrusions are within the intended scope of this disclosure.

Figure 5:
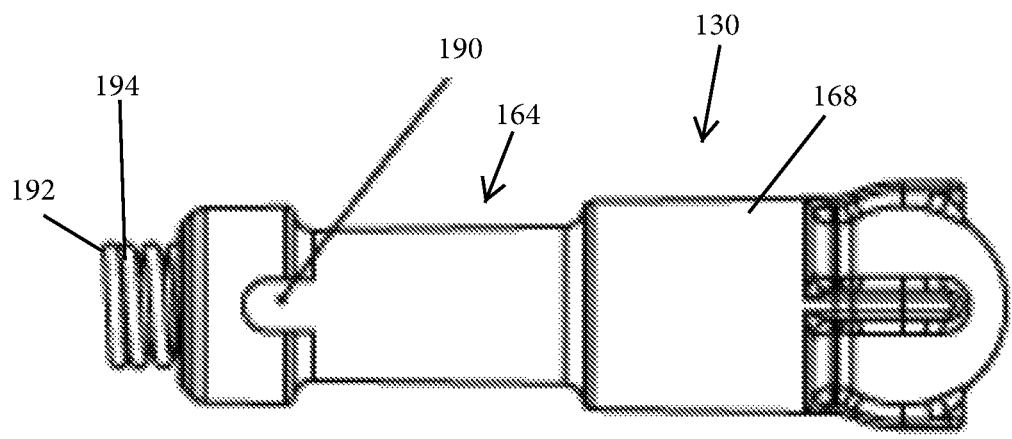
FIG. 5 is a side view of a second embodiment of a mount attachable to the passenger armrest of FIG. 1.

FIG. 5 is a side view of a second embodiment of a mount 130 for use with passenger armrest 10 when a fixed, non-rotation of an accessory is desired. According to the second embodiment, the first end portion 166 of mount 130 includes a channel 190 in communication with the intermediate portion 170. Channel 190 has a width sized to receive an end portion of key 60. Channel 190 is located 180 degrees from the key formed in first end portion 166 (i.e., like key 74 of mount 30). When the key of first end portion 166 clears the keyway and mount 130 is fully inserted within cavity 26, mount 130 is rotated 180 degrees and channel 190 is brought into engagement with the key 60. To assist in maintaining engagement of cavity 190 with key 60, mount 130 may include a biasing device 192, such as a spring or an elastomeric member to bias the body 164 of mount 130 towards key 60. In one embodiment, body 164 may include a central bore for capturing a first portion of the biasing device within the body 164 allowing a second portion 194 to extend from the body 164 a sufficient distance to engage the end wall of cavity 26 and load the biasing device to bias the channel 190 toward key 60.

Figure 6:
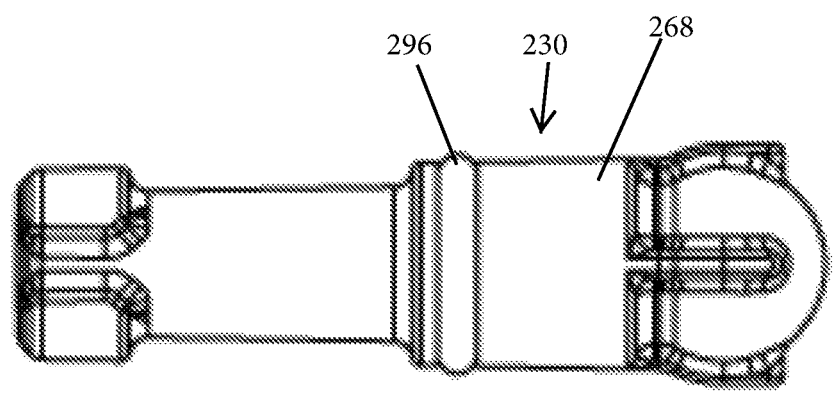
FIG. 6 is a side view of a third embodiment of a mount attachable to the passenger armrest of FIG. 1.

FIG. 6 is a side view of a third embodiment of mount 230, which is similar to mount 230 with the exception of a friction ring 296 positioned on second end portion 268. To aid in connection friction ring 296 on second end portion 268, the second end portion 268 may include a circumferential recess (not shown) in the outer surface of second end portion 268. Friction ring 296 may comprise a soft, compressible elastomer or rubber. Friction ring 296 has an inner diameter that will fit into the circumferential recess and an outer diameter that is greater than the outer diameter of second end portion 268, such that when mount 230 is inserted into cavity 26, the friction ring 296 will frictionally engage the cavity surface 62 and provide resistance to rotation of body 164. If no rotational resistance for body 164 is desired, the mount 230 can be operated like mount 30 by removing the friction ring 296.

A passenger arm rest as disclosed and described is mountable to a motorcycle structure near a passenger backrest, such as a trunk lid, and provides a location for a passenger to rest his or her arms. Further, the armrest provides a mounting location for a mount for holding accessories with a socket connector. A keyed cavity can be formed in the passenger armrest and a mount can be fitted with a keyway that allows the mount to be inserted and retained within the cavity, yet able to rotate within the cavity to allow accessories connected to the mount to, for example, remain level and/or swivel in response to forces the motorcycle may experience. Embodiments of the mount also are able to lock mount from rotation, or restrict rotation within the cavity. A cover includes a keyway on a cylindrical body to friction fit within and cover the cavity when the mount is not in use.

Although the passenger armrest and accessory mount has been described with reference to preferred embodiments, workers skilled in the art will recognize that changes can be made in form and detail without departing from the spirit and scope of the disclosed mounting structures. For example, the ball associated with the disclosed mount can be replaced with an alternate coupler, or an accessory can be directly coupled to the second end portion of the cylindrical body. Applicant intends that the examples described above do not limit the scope of application's invention, which is defined by the claims below. Applicant's descriptions are not intended to redefine the terms set forth in the claims unless applicant has expressly stated that a term means something different than the plain import of the terms.

What is claimed is:

1. An armrest for connection to a motorcycle structure adjacent to a passenger backrest, the armrest comprising:
    a framework comprising:
        an arm having a first portion and a second portion, the first portion having a connector at a terminal end thereof for attachment to the motorcycle structure;
        an armrest body carried on the second portion of the arm, the armrest body comprising a frame within the body and connected to the second portion of the arm, the frame configured to define a cylindrical cavity having an inner surface, the cavity being exposed on a side of the armrest body, the cavity having a key on a portion of the cavity inner surface;
    a mount having a cylindrical body comprising a first end portion, a second end portion and an intermediate portion between the first and second end portions, the intermediate portion having a diameter that is less than that of the first and second end portions to define a recess in the body, the first end portion configured to define a keyway capable of receiving the key of the cavity, the recess sized to retain the key of the cavity between the first and second end portions when the key has passed through the keyway, the second end portion being connectable to an accessory.

2. The armrest of claim 1, wherein the second arm portion has a first side and a second side and an opening therebetween, and wherein the frame comprises a first frame member and a second frame member, the first frame member connected to the first side of the second arm portion, the second frame member connected to the second side of the second arm portion, the cavity extending through the opening from the first frame portion to the second frame portion.

3. The armrest of claim 1, wherein the second end portion comprises a spherical terminal end.

4. The armrest of claim 3, wherein the spherical terminal end has an outer surface, the outer surface of the spherical terminal end including one or more protrusions.

5. The armrest of claim 3, wherein the one or more protrusions are linear protrusions that are generally parallel to an axis of the cylindrical body of the mount.

6. The armrest of claim 3, wherein the one or more protrusions are generally equally radially spaced about the spherical terminal end.

7. The armrest of claim 1, wherein the second end portion is integrally connected to an accessory.

8. An armrest for mounting to a motorcycle trunk lid adjacent to a passenger backrest of a motorcycle, the armrest comprising:
    an arm having a connector, for connecting the arm to the motorcycle trunk lid, and a free end spaced from the connector;
    an armrest body connected to the arm, the armrest body comprising a top surface and first and second side surfaces, the armrest body having a cavity within the armrest body that is exposed at the first side surface; and
    a mount attachable within the cavity of the armrest body to extend from the first side surface of the armrest, the mount capable of attachment to a socket connector of an accessory, the mount being detachable from the cavity of the armrest body.

9. The armrest of claim 8, wherein the free end of the arm is within the armrest body.

10. The armrest of claim 9 and further comprising a frame within the armrest body and connected to the arm.

11. The armrest of claim 8, wherein the cavity has a key on a portion of an inner surface of the cavity, and wherein the mount has a first end portion configured to define a keyway capable of receiving the key of the cavity.

\* \* \* \* \*